PRIORITY CIRCUIT
Filed April 24, 1961 6 Sheets-Sheet 1
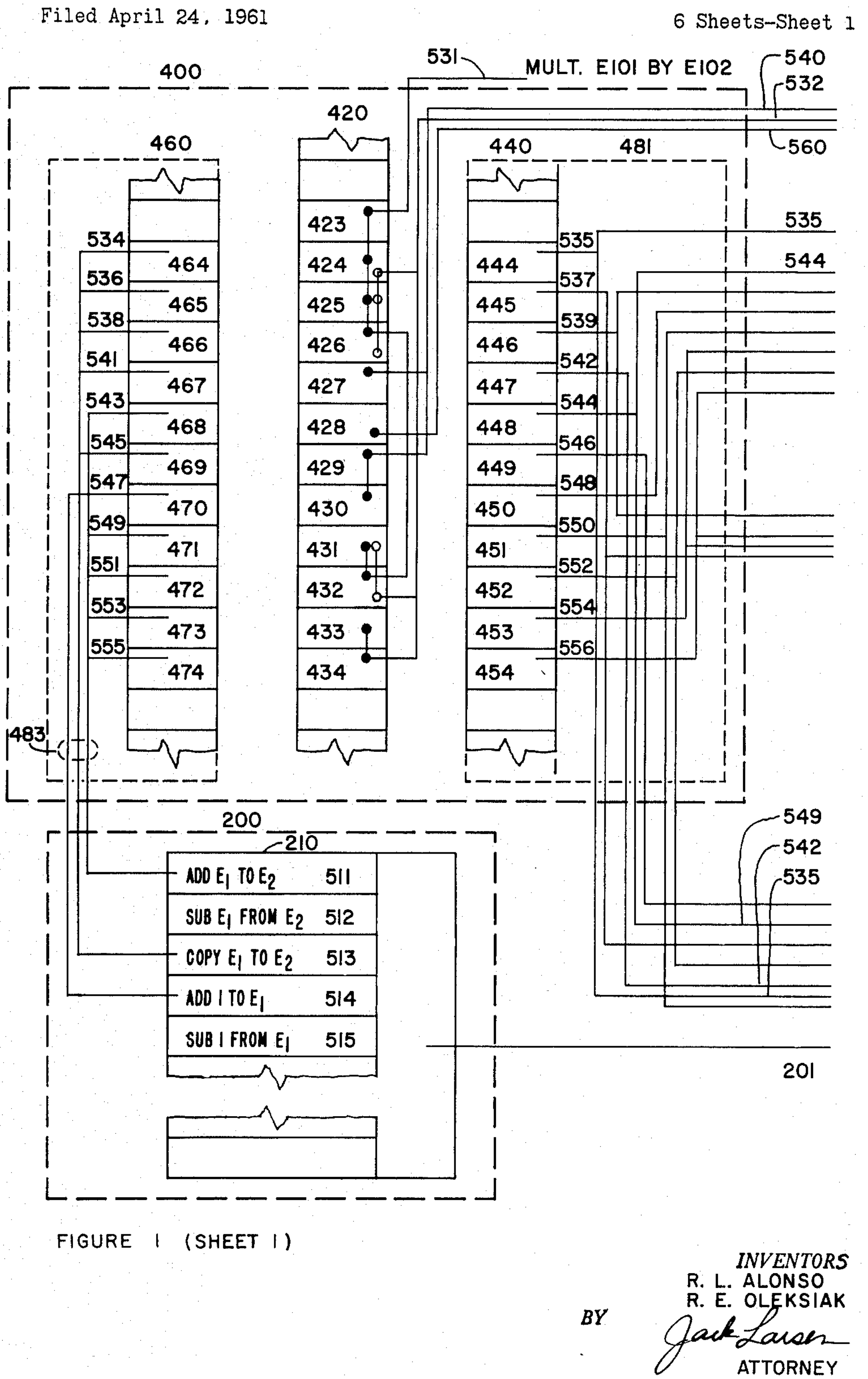
FIGURE 1 (SHEET 1)
INVENTORS
R. L. ALONSO
R. E. OLEKSIAK
BY Jack Larsen
ATTORNEY PRIORITY CIRCUIT
Filed April 24, 1961 6 Sheets-Sheet 2
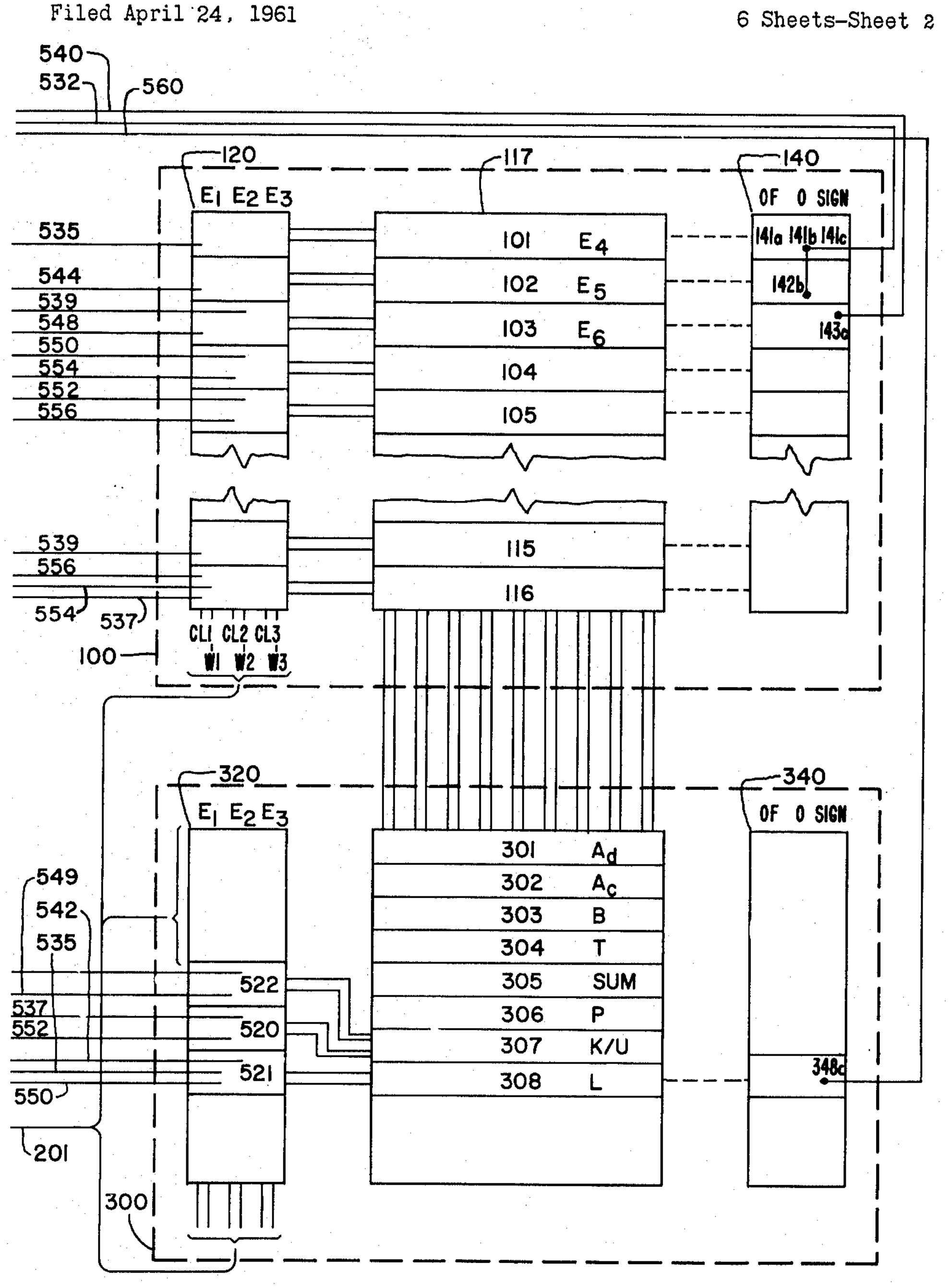
FIGURE I (SHEET 2)
INVENTORS
R. L. ALONSO
R. E. OLEKSIAK
BY Jack Larsen
ATTORNEY Nov. 30, 1965 R. L. ALONSO ETAL 3,221,178
PRIORITY CIRCUIT
Filed April 24, 1961 6 Sheets-Sheet 3

INVENTORS
R. L. ALONSO
R. E. OLEKSIAK
BY Jack Larsen
ATTORNEY

PRIORITY CIRCUIT

Filed April 24, 1961 6 Sheets-Sheet 4

INVENTORS
R. L. ALONSO
R. E. OLEKSIAK
BY Jack Larsen
ATTORNEY

PRIORITY CIRCUIT

Filed April 24, 1961 6 Sheets-Sheet 5

*INVENTORS*
R. L. ALONSO
R. E. OLEKSIAK
BY Jack Larsen
ATTORNEY

INVENTORS
R. L. ALONSO
R. E. OLEKSIAK
BY Jack Larsen
ATTORNEY 3,221,178
PRIORITY CIRCUIT
Ramon L. Alonso, Cambridge, and Robert E. Oleksiak, Webster, Mass., assignors to Massachusetts Institute of Technology, a corporation of Massachusetts
Filed Apr. 24, 1961, Ser. No. 105,104
9 Claims. (Cl. 307—88)

This invention relates to electronic digital computers and more particularly to a priority circuit for such computers.

The basic principles of logical design of modern electronic computing machines are now well-known in the art. A report by von Neumann et al. entitled "Preliminary Discussion of the Logical Design of an Electronic Computing instrument," available as PB 96703 from the Office of Technical Services, Department of Commerce is a leading source book in the field. That report developed the design principles for stored program machines with parallel arithmetic, that is, those in which the basic operations of transferring words between registers, and the fundamental steps of addition and subtraction are carried out simultaneously on all of the bits of a word rather than serially. With parallel arithmetic, the house-keeping routines of the computer take up relatively important portions of time compared to the decreased time required for basic calculations. In particular, time required for the steps of scanning a large number of data sources, and storing and retrieving program words can exceed the time needed for calculations in the solution of many problems of practical importance.

It is an object of this invention to provide a circuit whereby the time required for programming steps of a computer can be substantially shortened. It is another object of the invention to provide circuitry for the rapid scanning of data sources. A further object of this invention is to provide an electronic digital computer suited primarily for simple problems.

A feature of the invention is a priority circuit using magnetic cores such that a pattern of magnetized states may be propagated as in a shift register with the difference that the order of steps is alterable in accordance with the priority and occurrence of events. Other objects and features of this invention will be apprehended from the following specification and annexed drawings of which:

FIG. 1 is a logical block diagram of a computer embodying the invention,

Figure 3:
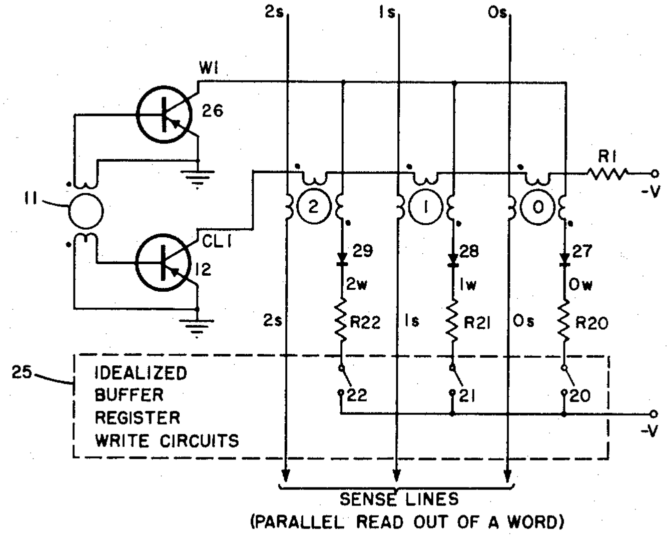
FIG. 3 is a skeleton schematic diagram of a three bit erasable register.
Figure 5:
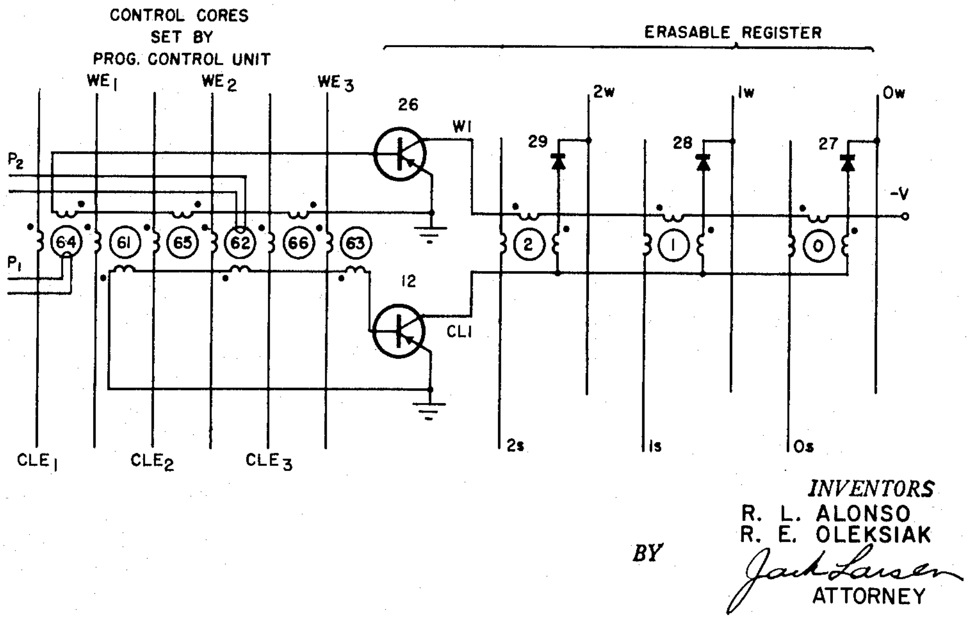
Figure 4:
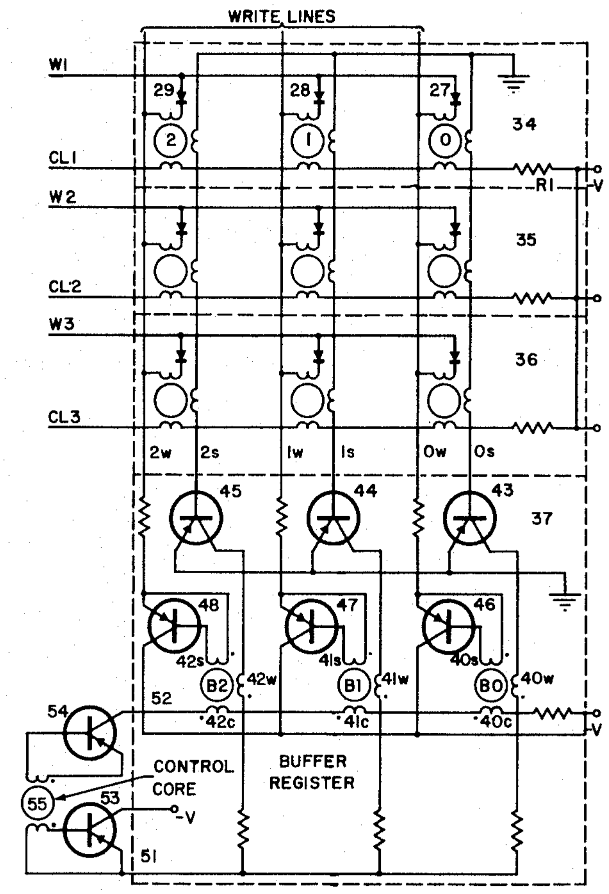
Figure 6:
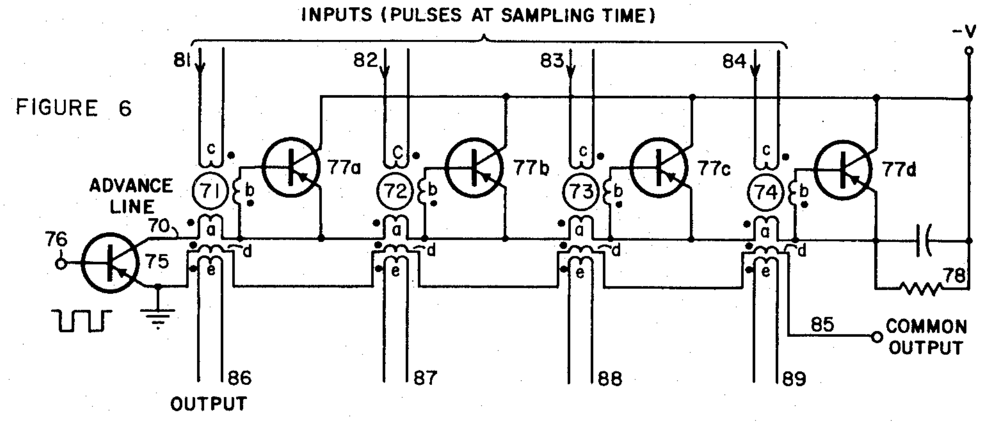
Figure 7:
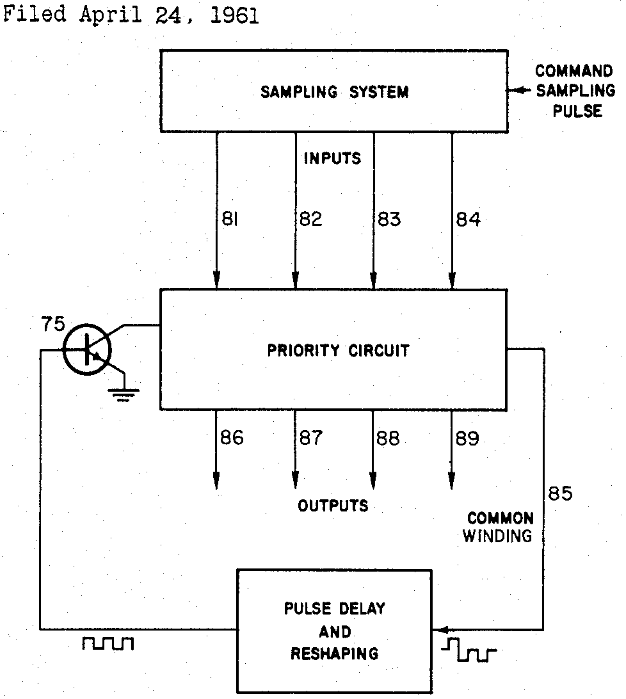
Figure 8:
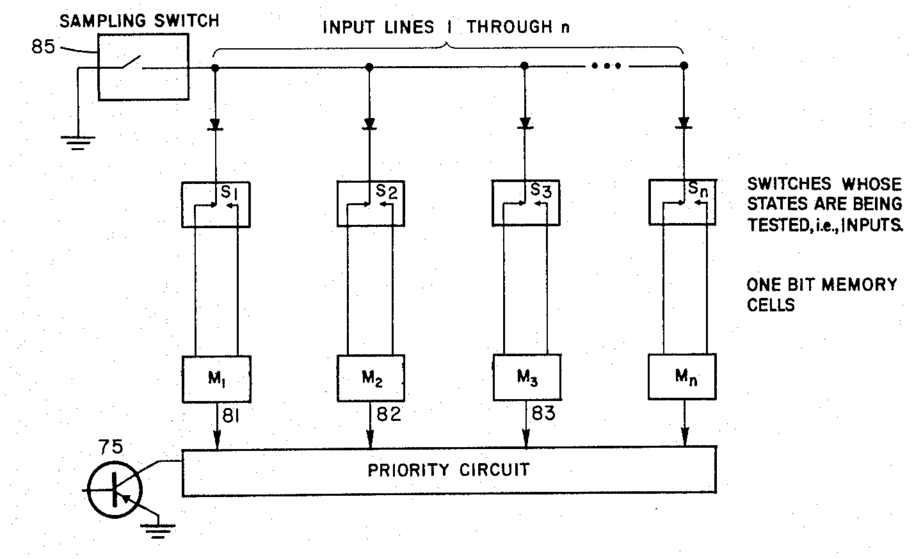
Figure 9:
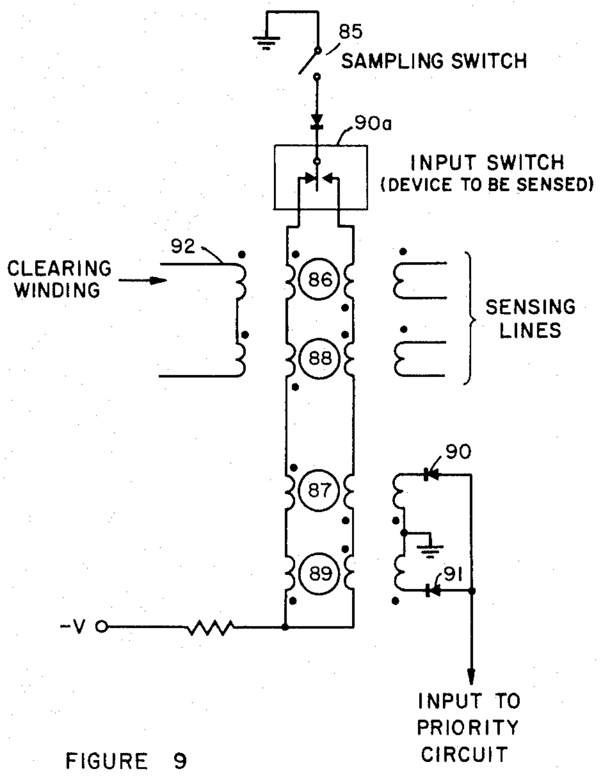
Figure 10:
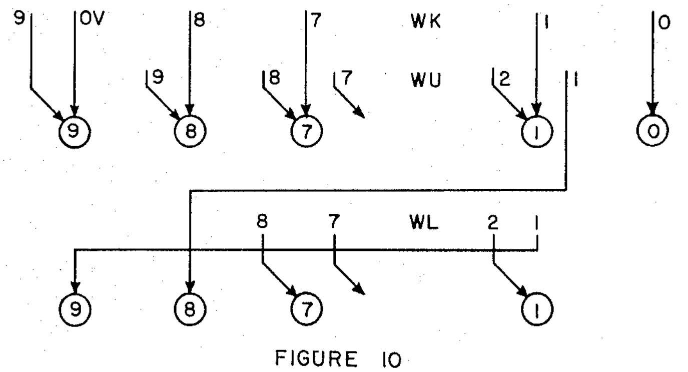

FIG. 4 is a simplified schematic diagram of an erasable memory with three registers as shown in FIG. 3 and a buffer register, FIG. 5 is a schematic diagram, illustrating the interconnection of control matrix and erasable memory, FIG. 6 is a schematic diagram illustrating the operation of a preferred embodiment of a priority circuit in accordance with the invention, FIG. 7 is a block diagram illustrative of the relation of priority circuit and other circuit elements, FIG. 8 is a block diagram illustrating further the use of a priority circuit, FIG. 9 represents an embodiment of a one-bit memory unit, and FIG. 10 illustrates the wiring of certain special registers.

The computer comprises four elements: an erasable storage medium 100, a sequence generator 200, an arithmetic unit 300 comprising a small number of associated central registers, and a program unit 400.

The erasable storage medium 100 provides for storing, reading in, and reading out groups of bits called "words." The means for storing a "word" is termed a "register."

Any convenient number of registers may be incorporated in the memory. For purposes of illustration, sixteen registers 101 through 116 are shown in a matrix 117 nine bits wide and 16 words high. Associated with the matrix 117 is an addressing matrix 120 and a sensing matrix 140. The addressing matrix is wired to select designated words of the memory for processing. In the illustrative programs explained below each elementary order carried out by the sequence generator involves not more than three words from erasable storage, these three words being designated $E_1$, $E_2$, and $E_3$. The matrix 120 determines which of the words of the matrix 117 shall be operated on as $E_1$, $E_2$, and $E_3$ at a given step of the program.

The sensing matrix 140 (also illustrated as a three bit by 16 line array) monitors the erasable matrix 117, according to certain criteria. The "state" of each word of the matrix 117 as measured by these criteria is indicated by a word in the sensing matrix 140. In the illustrated embodiment the first bit 141*a* of a word 141 in matrix 140 indicates presence or absence of overflow in the corresponding word 101 of a storage matrix 117, the second bit 141*b* indicates the zero or non-zero state of the stored word 101. The third bit 141*c* is a sign bit, indicating a "0" if word 101 is negative, a "1," otherwise. Signals derived from the sensing matrix are sensed by the program unit to provide modification of programs depending upon the stored quantities.

The sequence generator 200 forms what is commonly called the logic of the computer; it generates the necessary pulses on appropriate conductors in the required order to select each of several selectable elementary operations of the computer. The central registers 300 are registers associated with the sequence generator 200 and controlled by it. Certain registers of the Central Registers are wired to facilitate operation on numbers as they are written into and read from the registers. The program unit 400 provides the source of successive computer instructions. The harness 201 conveys pulses from the sequence generator 200 to control the erasable storage 100 and central registers 300.

The program unit comprises three chains of circuit elements, a priority circuit chain 420, a chain 440 of addressing outputs and a chain 460 of sequence selecting outputs. In the preferred embodiment these chains consist of magnetic cores with associated transistors and diodes. The priority circuit is in the nature of a shift register that skips steps on command. At each step predetermined words of the memory matrix 117 are activated and a particular sequence within the sequence generator is selected. The particular words are determined by the program wire harness 481 interconnecting the addressing chain 440, the addressing matrix 120 and the central registers 300. The particular sequence selected is determined by the harness 483 interconnecting the sequence selecting chain 460 and the sequence generator 200. Thus the program of this computer is embodied in the interconnection pattern of the harnesses 481 and 483 rather than in the form of words of memory to be decoded by a central logic.

Figure 2:
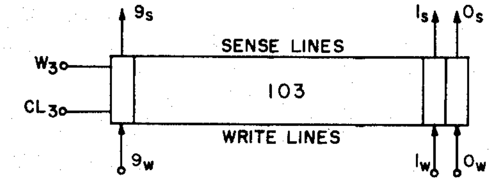
FIG. 2 is a simplified representation of an erasable register.

FIG. 2 is a functional representation of one register 103 of the matrix 117. The bistable elements forming the basic memory cells are contemplated herein to comprise cores of square-hysteresis-loop magnetic material, saturable in a plus or minus sense. Examples of such cores are Mo Permalloy tape cores, or ferrite cores.

A row of nine such cores stores a word of nine bits. Sixteen of such rows form the matrix 117 of which the register 103 is a part. The bits of each rank form columns, each register a row. Bits are ranked zero through 9. The bit of zero rank indicates parity, those of higher rank, the successively higher powers of two, binary aritmetic being employed. Write lines, 0*w*, 1*w*, . . . 9*w* and Sense lines, 0*s*, 1*s*, . . . 9*s* thread the matrix of cores top to bottom. White lines W1, W2, W3, . . . W16 and Clear lines CL1, CL2, CL3, . . . CL16 thread the registers side to side. In reading out or writing into the matrix the presentation is parallel, a separate line for each column of bits. A particular register of all those threaded by the same lines is selected for reading or writing by pulsing its CL or W line simultaneously with the sense (*s*) or write (*w*) lines.

Shown in FIG. 3 is a three-bit erasable register. When the control core 11 is made to switch from a ZERO to ONE, transistor 12 saturates, and conducts, and cores 0, 1, and 2 are cleared to ZERO. Those cores which are at ONE will induce an E.M.F. in the corresponding Sensing lines 0*s*, 1*s* or 2*s* in the process of being cleared; ideally, those which are already at ZERO will not. Note that the process of reading out from an erasable register leaves all its cores at ZERO. If the original contents are to be preserved they must be written back into the register by a subsequent operation.

To write a word into an erasable register it is necessary to provide a current source on those writing lines for which a ONE is desired. This in indicated in idealized forms by a set of relay contacts 20, 21, and 22 in the buffer 25 in FIG. 2, connecting the write lines 0*w*, 1*w*, and 2*w* to a point −V1 of negative potential. To write into a register is physically the same as to set all the register's cores; the convention used here is that whole registers are "written" into, while individual cores are "set." Both are "cleared." Writing occurs when the control core is switched from ONE back to ZERO. At this time transistor 26 acts as a gate to permit current to flow from ground to the point −V2 of negative potential. A ONE is therefore placed in those cores which correspond to closed switches in the buffer register 25. The diodes 27, 28, and 29 of the Write lines 0*w*, 1*w*, 2*w* prevent interactions between nonselected cores and registers.

A system of three erasable registers 34, 35, and 36 of three bits each, together with a buffer register 37, is shown in FIG. 4. The register 34 is as shown in FIG. 3. It is seen that the buffer 37 itself is a modified erasable register. The buffer contains three saturable cores, B0, B1, and B2, one core for each bit of parallel data to be handled. Each core is threaded by a number of windings. In the case illustrated, core B0 is threaded by a "clear" winding 40*c*, a "sense" winding 40*s*, and a "write" winding 40*w*; similarly core B1 is threaded by three windings 41*c*, 41*s*, and 41*w*, and core B2 is threaded by three windings 42*c*, 42*s*, and 42*w*.

The buffer is separated from the storage registers 34, 35, and 46 by sensing amplifiers 43, 44, and 45 and by writing amplifiers 46, 47, and 48. Reading and writing into the buffer is controlled by a write line 51 and a clear line 52. These lines are activated by transistor switches 53 and 54 respectively which in turn are activated by a control core 55, or cores. In order to transfer a word from a register 34 to the buffer 37, it is necessary to have time coincidence between a pulse on the Clear line CL1 of the register 34 and a pulse on the Write line 31 of the buffer 37. To transfer a word from buffer 37 to register 34, the process must be reversed; i.e., the Clear line 32 of the buffer and the Write line W1 of the register 34 are pulsed at the same time. The Clear and Write lines of register 34 in FIG. 4 are transistors 12 and 26 as in FIG. 3; similarly, erasable registers 35 and 36 comprise an array of cores and diodes plus two transistors.

The results of pulsing a register's Clear line without simultaneously pulsing the buffer's Write line will be to leave all the cores of the cleared register at ZERO, and the cores of the buffer unaffected. If the buffer is cleared and the register Write line is pulsed, without having previously cleared the register, then the contents of that register will be the "logical sum" or bit by bit "or" of ONE's from the word previously in that register (word A), and the word just cleared from the buffer (word B). In other words, the register will contain a ONE in those positions in which either word A or word B (or both) had a ONE.

Another possibility is that of transferring information between the buffer and two or more registers at the same time. If, at the time the buffer is cleared, the Write lines of the several registers are impulsed, the contents of the buffer will be transferred into each register (assuming them to have been cleared previously). Correspondingly, if two or more registers are cleared at once, the resultant information written into the buffer will be the logical sum of the contents of those registers.

As mentioned above, the selection of a particular register of the erasable storage for entry or read-out is under control of the program control unit 400 and the addressing matrix 120. In an arrangement as shown in FIG. 3, clearing and writing are alternately effected by switching of the control core 11. In FIG. 5 selection of a register e.g., 34 is effected by providing separate write control cores 61, 62, and 63 and clear control cores 64, 65, and 66 for each column of the addressing matrix. Under control of the sequence generator 200, the clear control lines, CLE1, CLE2, CLE3, and Write control lines WE1, WE2, and WE3 are pulsed. Upon pulsing of CLE1, only those clear cores in the first column of the addressing matrix 120 will switch that have previously been set by pulses from the program unit 400. Thus core 64 which is linked by line P1 may be set so pulsing of CLE1 will clear register 34. The word will be transferred to a buffer if the control cores of the buffer are set to pulse, simultaneously with CLE1, the write lines of the buffer. Clearing and writing are independent; a ONE is placed in a WRITE control core directly by the program step selection. Thus it is here possible to clear a register without writing back into it, or to write without clearing, if desired.

Referring back to FIG. 1, the program unit 400 comprises programming chain 420 containing a core for each possible step of the computer program. Preferably this chain of program control cores comprises a priority circuit as described below which is arranged to skip or repeat steps depending upon the result of prior steps. For each link in the chain 420 there is a corresponding link in the addressing output chain 440 and the sequence selecting chain 460. Each link in the addressing chain 440 contains transistor circuits which transmit a pulse of current through the wires of harness 481 to set to a ONE prescribed cores in the addressing matrix 120 of the erasable storage 100 and specified cores in the control matrix 320 of the central registers 300. Similarly transistor circuits in the sequence selecting chain 460 generate pulses which set preselected cores in the sequence generator 200. The selection of cores is determined by the pattern of connections in the harness 483 which interconnects the program unit 400 and sequence generator 200. In practice, the functions of sequence selecting chain 460 and addressing chain 440 may be combined. They are separated for clarity of illustration. The program control cores with their associated circuits are in a sense analogous to the successive words in storage in an ordinary computer program. At the end of each control pulse sequence, the program unit clears one of these cores to set up the next sequence to be executed and the registers to be used for data. Typical instructions may be $C(A)+C(B)$ into A, or $C(A-1)$ into A, meaning respectively add the contents of registers A and B returning the arithmetic sum to A, and take the contents of register A and return to A the quantity diminished by 1 where A and B are both erasable registers. Use of the sequence generator and central registers, however permits a quite diverse set of instructions if desired.

To initiate a program step, one of the cores in the programming chain 420 is cleared from ONE to ZERO by an initial control pulse from the sequence generator 200. The links of chains 440 and 460 associated with this specific core then, by permanently wired connections 481 and 483, place ONE's in the desired CLEAR and WRITE control cores of the matrix 120 for erasable storage 100 and, in addition, cause a row of cores to be set to ONE's within the sequence generator logic unit 210. An appropriate control pulse sequence is thereby initiated, causing the execution of the desired computer instruction. As a part of this sequence, data is cleared from and written into erasable storage matrix 117 using control pulses CLE1, CLE2, CLE3, WE1, WE2, WE3 which control those specific registers whose CLEAR and WRITE cores were set.

The priority circuit (FIG. 6) is a device which permits certain economies in the handling of inputs. The circuit itself is related both to counters and to shift registers. It comprises an advance line 70 which threads in serial connection a plurality of square-hysteresis-loop magnetic cores 71, 72, 73, 74. These cores together with the capacitance of connected semi-conductor junctions and distributed capacitance form a delay line of substantially identical low-pass pi filter sections in cascade. The cores 71, 72, 73, and 74 with their associated windings are the series elements of the circuit; while the emitter-collector capacitances of the associated semi-conductor junctions are the shunt elments so that advancing pulses applied through transistor 75 act on the first core in line first. Each of the cores 71, 72, 73, and 74 is surrounded by windings *a*, *b*, *c*, *d*, and *e*. The particular winding being referred to in this description is given the ordinal of its associated core, e.g., 72*d*, 74*a*. On each core, windings *a* and *b* are the two sides of a tapped winding. For purposes of description hereinafter, the dotted end of 71*a* is called the "start," the junction of 71*a* and 71*b* is called the "intermediate point"; and the undotted end of 71*b* is called the "end." Further, the dotted end of 72*a* is called the "beginning"; the junction of 72*a* and 72*b* is called the "tap"; and the undotted end of 72*b* is called the "termination." The same nomenclature applies to the remaining pair of cores 73 and 74, and so forth for any additional pairs of cores in the advance line 70.

Looking at core 71, winding 71*a* has its start connected to the collector of transistor 75, its intermediate point connected to the emitter of transistor 77*a* and the beginning of winding 72*a*; and the end of winding 71*b* is connected to the base of transistor 77*a*. Looking at core 72, the beginning of winding 72*a* is connected to the intermediate point of 71*a*; the tap is connected to the emitter of transistor 77*b* and the start of winding 73*a*; and the termination of winding 72*b* is connected to the base of transistor 77*b*. The operation of the circuit is as follows: Let all cores 71, 72, 73, 74, be initially in state ONE. When transistor 75 is saturated by application of a negative advancing pulse to base 76 core 71 starts to switch, and in so doing it causes first-in-line transistor 77*a* to switch. As a result current flows through transistor 77*a* and the windings of core 71, with almost no current flowing through the windings of the remaining cores 72, 73 and 74. The series resistor 78 is seelcted to have a value large compared to the saturation resistance of transistor 77*a*. The duration of the negative pulse is such that transistor 75 is turned off at the same time that transistor 77*a* finishes conducting; transistor 77*a* stops conducting shortly after core 71 finishes switching.

The next time an advancing pulse is applied to the base 76 of transistor 75, core 71 will be at ZERO; cores 72, 73, and 74 at ONE. This time the second-in-line core 72 switches in exactly the same fashion as did core 71 on the previous pulse.

If all the cores of the chain start at ONE, then the chain behaves much as the shift register with a single ONE traveling down it. The number of cores in the chain determines the number of advancing pulses necessary to make the last core switch. In the case of the priority circuit, however, it is possible to reduce the effective length of the chain by not starting with all ONE's. For example, if core 73 had started at ZERO, then it would be the third advancing pulse instead of the fourth, which causes core 74 to switch.

Because of the delay in propogation of an advancing pulse through cores in the ZERO state, it is necessary that each of the transistors 77*a*, *b*, *c*, *d*, of the priority chain in its turn continues to conduct current for a short time after its priority core has finished switching, i.e., transistor 77*a* continues to conduct after the switching of core 71.

This short time is preferably provided by the phenomenon of minority carrier storage in transistors.

The advancing pulse must last long enough to cover the propogation delay plus the switching time of the last core of the priority chain assuming equal switching time for all cores. This in turn requires that the first transistor 77*a* of the chain (FIG. 6) be in the conducting state for all of the duration of the advancing pulse, so that a ONE in the second core may not be disturbed.

An alternative method for handling this problem is to select the number of turns in each successive core in such a way that each successive core switches faster than the preceeding one by a time equal to the delay in propagation of the advancing pulse through a single priority stage, where the core is in state ZERO.

Inputs are in the form of pulses on a set of input leads 81, 82, 83, 84 such that a pulse on an input lead sets a core to a ONE. Input pulses can only occur at a specific sampling time $T_S$. A winding 85 common to all the cores in the priority circuit is used to sense whether or not one or more inputs occur during a sampling time $T_S$. When one or more inputs do occur, then the pulse which appears on the common winding 85 is used, after a suitable delay, inversion, and reshaping, as an advancing pulse applied to transistor 75 to drive from a ONE to a ZERO, the first core to be in state ONE, which in turn creates outputs at one of the individual output windings 86, 87, 88, 89, and at the common output. This last pulse, again delayed and reshaped, but this time not inverted, can be used to trigger transistor 75 once more. The process schematized in FIG. 7 will continue until all the cores in the priority circuit are at ZERO, and will require as many advancing pulses as there were inputs at $T_S$ (plus one). The name "priority" arises from the fact that input line 81 is always served (i.e., core 71 cleared to ZERO) first if it has an input, and input line 82 next, so that line 81 has priority over line 82, and so forth.

The sampling system of FIG. 7 is shown in more detail in FIG. 8. The inputs to the priority circuit are pulses generated by memory units $M_1$, $M_2$, $M_3$, $M_n$ indicating that one of the switches, $S_1$ $S_2$, $S_3$ $S_n$ has changed state since the last sampling time. This type of input, rather than a type which gives forth a pulse for every "on" switch every sampling time, permits an input system with some advantages over conventional input scanning systems. Furthermore, the memory units $M_1$, $M_2$, $M_3$, $M_n$ of FIG. 8 can be so designed as to provide information on the actual state of the corresponding switches, and thus avoid the dangers of a pure "change of state" system, which is vulnerable to loss of pulses. An embodiment of the memory units is described below.

With the priority circuit instead of a shift register, the number of advancing pulses is determined by the overall activity of the input lines rather than number of such lines. Hence, advantage may be taken of any collective properties of the input lines, such as, for instance, that they be many in number but that their average activity be low.

More important perhaps is the ability to increase the sampling rate to keep pace with the fastest of the input channels, without necessarily requiring the advancing pulses on transistor 75 to speed up proportionately. As a numerical example: In a typical system the processing of one pulse requires 200 microseconds. Of 30 input channels, 6 have up to 400 pulses per second whereas the rest have no more than 10 pulses per second each. A maximum of 2640 pulses per second is therefore involved. A scanning system which requires 200 microseconds to look at each channel, whether a pulse is present there or not, cannot cope with the situation as described. To do so would require a processing rate of $30\times400=12{,}000$ pulses per second. Of course two separate scanning systems could be employed, one to scan the six high frequency channels and the other to handle the rest.

In a sense, the priority circuit input system acts in this way, except that it adapts itself automatically to varying input requirements. All that is required is to make the sampling rate fast enough to match the fastest of the input channels and, simultaneously, to be able to process pulses fast enough to handle the total load. Thus, in the example cited, a sampling rate of 500 per second would permit ten advance pulses on the priority circuit during each sample period (at 200 microseconds each), which would permit the six 400 cycle lines to be processed once each sample time and still leave time for handling four other pulses distributed among the remaining 24 lines. It could, of course, happen that more than four of the remaining 24 inputs would require processing in a particular sample period. However, the priority circuit would carry this information over until the next sample period and could be guaranteed to process each channel before the next pulse on that channel arrived. The priority circuit provides a means whereby the computer gives exactly the minimum possible amount of attention to its inputs, thus permitting highly efficient time sharing procedures.

A preferred embodiment of the memory units $M_1$, $M_2$, etc. mentioned earlier is the circuit shown in FIG. 9. Upon closure of the sampling switch 85, cores 86 and 87 are driven to ONE for one position of the input switch 90, and to ZERO for the other. Cores 88 and 89 are driven to ZERO and ONE, correspondingly. Cores 87 89 are always in opposite states, and will change states only if the input switch has changed states since the last closure of the sampling switch. A full wave rectifier comprising diodes 90 and 91 generates a negative pulse every time 87 and 89 change states, and this pulse constitutes the input to the priority circuit.

Cores 86 and 88 are used when it is necessary to ascertain the state itself, rather than a change of states of the input switch 90*a*. These cores may be both cleared to state ZERO simultaneously by windings 92 and their outputs sensed. Note that only one of core 86 or 88 may be at ONE. The next closure of the sampling switch 85 restores the proper core to a ONE, in correspondence with the state of the input switch 90*a*.

The central register matrix 310 of the computer of FIG. 1 comprises six central registers, $A_d$, $A_c$, B, T, Sum and P with two special registers designated $K/U$ and L. Register T is a time register for real-time applications; as is seen below in discussion of control pulse sequences, it is incremented by one every ten pulse times. The SUM register receives and adds two simultaneous inputs, transferred in parallel over separate sets of write lines, one set from register B and the other from $A_d$ or $A_c$. Registers B, P, $A_d$, and $A_c$ can all be written from matrix 117 of erasable storage E or from T or SUM. Also, B and P can write directly into E, T, or SUM. Sense-write amplifiers associated with $A_d$ and $A_c$ write only into SUM, however. The operation of adding the contents of $A_c$ or $A_d$ to the contents of B is effected by the simultaneous control pulses CL $A_d$ (or CL $A_c$), CL B, WSUM, leaving the result in register SUM. Register B is an ordinary register $A_d$ is ordinary, and $A_c$ is a complementing register, i.e., a register in which incoming ONE's are converted to ZERO's, and vice versa.

The parity register, P, accepts inputs on all 9 Sense lines and computes whether the number of ONE's in the word being read into it is even or odd. Its output is one bit long and occupies bit position 0; if the number of ONE's in the word is even, then the parity bit will hold a ONE. A parity system is employed in which the total number of ONE's in a word, including its parity bit, must be odd to pass the parity test. When such a word is read into P, the contents of the parity bit will be zero, so that an alarm will not be triggered when P is subsequently cleared and tested. If, on the other hand, an 8 bit word is read into P with its parity bit missing, the parity register computes and stores the correct value in bit position 0. Thus the parity may be transferred to E storage along with digits 1–8 by clearing P at the same time the remainder of the word is stored.

Five control pulse sequences are considered here. Each of these is ten pulses in length and starts with a common prelude of four pulses whose function is to increment the time register and, by testing the priority chain, to set up one of the five instructions (or no instruction) for the remaining six pulse times.

The individual steps of the control pulse sequences are communicated as described above between the sequence generator 200 and registers 100 and 300 by a harness 501 over which the required pulse patterns for the elementary operations of clearing, writing, and setting.

Each computer clock cycle is divided into two equal intervals called $\alpha$ time and $\beta$ time. The computer runs on a two beat system in which at $\alpha$ time information flows into (or towards) the buffer 303, (abbreviated B) and at $\beta$ time towards erasable storage. Certain control pulses, such as WB and $WA_d$ can occur only at $\alpha$ time, while others as CL B are constrained to occur only at $\beta$ time.

The prelude sequence is as follows:

TABLE 1: PRELUDE

1 $\alpha$ CL T, WB, WP, $P1A_d$
2 $\beta$ CL $A_d$, CL B, WSUM, CL P, TP
3 $\alpha$ TPR, CL SUM, WB, WP, $W1A_c$
4 $\beta$ SI, CL B, CL P, WT In the first line, control pulse $P1A_d$ (plus one into $A_d$) writes the number $+1$ in register $A_d$; an analogous control pulse $M_1A_d$ (minus one into $A_d$) appears later in the decrementing sequence. The control pulse TP stands for "test parity"; the pulse TPR denotes "test priority" and is the pulse that clears one core in the priority chain 420, and above in connection with FIGS. 6 and 7 called the "advancing pulse." The direct output of the sequence selecting chain 460 places a ONE in one of five cores in the sequence generator matrix 210 to select a corresponding instruction at pulse time 3. The control pulse SI (select instruction) at time 4 then clears these cores, causing one of five associated circuits to become active and set a row of ONE's in the cores of the sequence generator.

The five elementary orders defined here, and their corresponding control pulse sequences, are given in Tables 2 through 6.

TABLE 2: ADD $E_1$ TO $E_2$

5 $\alpha$ CL $E_1$, $WA_d$, WB, WP
6 $\beta$ CL B, $WE_1$, CL P, TP
7 $\alpha$ CL $E_2$, WB, WP
8 $\beta$ CL $A_d$, CL B, WSUM, CL P, TP
9 $\alpha$ CL SUM, WB, WP
10 $\beta$ CL B, CL P, $WE_2$

TABLE 3: SUB $E_1$ FROM $E_2$

5 $\alpha$ CL $E_1$, $WA_c$, WB, WP

6 $\beta$ CL B, $WE_1$, CL P, TP
7 $\alpha$ CL $E_2$, WB, WP
8 $\beta$ CL $A_c$, CL B, WSUM, CL P, TP
9 $\alpha$ CL SUM, WB, WP
10 $\beta$ CL B, CL P, $WE_2$

TABLE 4: COPY $E_1$ INTO $E_2$

5 $\alpha$ CL $E_1$, WB, WP
6 $\beta$ CL P, TP
7 $\alpha$ CL $E_2$
8 $\beta$ CL B, $WE_1$, $WE_2$
9 $\alpha$ (no action)
10 $\beta$ (no action)

TABLE 5: ADD 1 TO $E_1$ (INCREMENTING SEQUENCE)

5 $\alpha$ CL $E_1$, WB, WP, $P_1A_d$
6 $\beta$ CL $A_d$, CL B, WSUM, CL P, TP
7 $\alpha$ CL SUM, WB, WP
8 $\beta$ CL B, CL P, $WE_1$
9 $\alpha$ (no action)
10 $\beta$ (no action)

TABLE 6: SUB 1 FROM $E_1$ (DECREMENTING SEQUENCE)

5 $\alpha$ CL $E_1$, WB, WP, $M_1A_d$
6 $\beta$ CL $A_d$, CL B, WSUM, CL P, TP
7 $\alpha$ CL SUM, WB, WP
8 $\beta$ CL B, CL P, $WE_1$
9 $\alpha$ (no action)
10 $\beta$ (no action)

For simplicity, all orders have been made of uniform length, 10 pulse times. The computer could be speeded up somewhat by terminating COPY, ADD1, and SUB1 at eight pulse times. To keep the time counter straight, a new control pulse $P_4A_d$ could be used instead of $P_1A_d$ in line 1, Table 1. Then the pulse P1A*d* added to line 7 of ADD and SUB would result in either a 4 or 5 being added to T each instruction time, depending upon whether the preceding instruction required 8 or 10 pulse times.

The selection of a particular elementary order is made at each step of the program chain 420. Wired connection is made to the Sequence Generator 200 through the harness 483 from the program selecting chain 460, whereby one of a group of sequences is selected. Blocks 511, 512, 513, 514, 515, in the sequence generator 200 represent the elements which control the five elementary sequences just described. To complete the instruction, designation of particular registers of erasable storage as $E_1$ and/or $E_2$ is required. This is accomplished by wiring between the addressing chain 440 and the appropriate elements of the control matrix 120.

Many problems require two or more distinct modes of operation; e.g., a control computer may have a system check-out mode and a system operation mode. Even where the various modes are quite distinct from each other, they can be made to share a substantial amount of common equipment in this computer at a very low additional cost. The trick to achieve two modes is to provide, where needed, a duplicate set of write gates for the various registers and two suitably gated addressing chains. One program step can thereby cause either of two actions to occur depending on which of two main gates is open. A resulting overflow can correspondingly set up alternative distinct patterns of subsequent program steps.

As a detailed example of the operation of the priority circuit in a computer, consider the program for the multiplication of two numbers by direct methods. Only the restricted case in which both numbers are positive is detailed; clearly a more elaborate program can be written to include all cases. The numbers are contained in two erasable registers designated $E_4$ and $E_5$. Three other ordinary registers designated $E_6$ Z, and $M_7$ are used.

The computer word is eight bits plus sign and parity; ten bits in all. The register Z116 contains the number zero and register $M_7$ 115 contains the number minus 7. Two specially wired registers are employed, as discussed in detail below. Because of special register wiring, parity checks are disabled by action of the program steps. The sign (bit 9) write bus is connected through priority cores to appropriate write gates, so that certain transfers of negative information activate program steps as required.

The special registers 307, 308 are addressable by three separate addresses, U520, L521 and K522. As illustrated in FIG. 10, the write wiring for K is ordinary except for the fact that a ONE on either bit 9 (sign) or the overflow bus will appear in core 9. Write wiring for U, which is composed of the same cores as K, causes the number to be shifted right one place with its low order bit (i.e., bit 1; bit 0 is the parity bit) appearing in bit 8 of register L. Register L itself shifts its input data right by one bit, with the low order input bit appearing in the high order (sign) position upon clearing L.

The multiplication program is given in Table 7:

TABLE 7: MULTIPLICATION PROGRAM $E_4 \times E_5$
1 COPY $E_4$ to L
2 COPY Z into U
3 COPY $M_7$ into $E_6$
4 COPY L into L
5 ADD $E_5$ to K
6 COPY U to U
7 ADD 1 to $E_6$ The multiplication of the contents of register 101 by the contents of register 102 is detailed in FIG. 1, as illustrative of the operation of the computer with priority circuit. The program is begun by the command Mult E101×E102 which is applied on line 521 to priority cores 423, 424, 425, and 426, by which the program is set up, and to cores 431, and 432 for the program steps by which exit from the multiplication routine is made.

Cores 424, 425, and 426 are also linked in the reverse direction (indicated by open dots) by line 533 sensitive to cores **141*b* and 142*b* which indicate zero's in registers 101 and 102 respectively. If either register 101 or 102 is zero, cores 424, 425, and 426 are set back to zero and an alternative program set up by activating cores 433 and 434**, which provide a simplified program for multiplication by zero.

In the non-zero case, multiplication proceeds as follows: Core 424 is stepped, whereby link 464 selects, by line 534 of harness 483, the sequence cores 513 for the order COPY $E_1$ into $E_2$, and link 444 of the addressing chain, by line 535 of harness 481 designates erasable register 101 as $E_1$, and special register L 308 as $E_2$. Upon completion of the order, the priority chain steps to core 425, whereupon link 465 by line 536 again selects the COPY order and link 445 addresses Z116, and U520 on line 537 as $E_1$ and $E_2$ respectively. The next step, to core 426, calls for another COPY order conveyed by links 466 and 446, and lines 538 and 539 to copy the contents of $M_7$ 115 into register 103. The sign of the register 103 is sensed in box **143*c* and activates by line 540, cores 427, 429, and 430 of priority chain 420. Stepping to core 427 calls for a fourth copy order conveyed by links 467 and 447 and lines 541 and 542 and resulting in shifting the contents of special register L 308 right by one bit as shown in FIG. 10. In the process, the sign bit of L register 308 is sensed at block 348*c* and used to activate core 428 which by links 468 and 448 and lines 543 and 544 calls for adding the contents of register 102** containing the multiplier to the special *K/U* register 307.

The action of the priority circuit causes it to recycle on cores 427, 428, 429, and 430. This results from the activation of core 427 by the sign of $E_6$ register 103. Each time the cycle passes core 430, register $E_6$ is diminished by one, thereby limiting the routine to eight passes. Actual multiplication is effected as the 9th bit in special register L308, occupying the sign bit position of an ordinary register does or does not activate core 428 controlling the addition step depending upon whether successive bits of the multiplicand from register 101 are ONE or ZERO.

Stepping to core 429, links 469 and 449, lines 545 and 546, calls for copying special register U307 into itself resulting in successive right shifting from U into L, so that the low order part of the product moves into L as the multiplicand factor $E_5$ is shifted out of L. The program leaves the full double precision product in registers U and L.

Stepping to core 430, links 470 and 450, lines 547 and 548, calls for ADD1 to $E_6$ register 103. The program is closed by stepping to program cores 431 and 432 which call for copying the product contained in registers L308 and U307 into registers 104 and 105 respectively. The connections are from links 471, 451, 472, 452, by lines 549, 550, 551, and 552.

The alternate program for zero factors skips from core 423 to cores 433 and 434 which direct the copying of zeros from Z register 116 into registers 104 and 105. The connections are from links 473, 453, 474, 454, by lines 553, 554, 555, and 556.

To point out the invention distinctly, it has been necessary to eliminate from this specification and the annexed drawings detailed description of parts and features which, while necessary to the operation of a practical embodiment of the invention, are well known in the art, so that a designer need not look to this specification for the preferred embodiment of these portions, but may make his selection based upon his own need and resources. At least 1500 parts are required to build a simple practical computer embodying this invention.

For definiteness, the invention has been described as embodied in circuitry designed around the technology of ferromagnetic memory elements and transistors. It will be understood that equivalent embodiments of the invention may also be designed around electrostatic, ferroelectric, cryogenic, and vacuum tube technology.

Having thus described the invention, what is claimed as new is:

1. A priority circuit comprising a first ferromagnetic core, a second ferromagnetic core, a winding on said first core, having a start, an intermediate point, and an end, a second winding on said second core having a beginning, a tap, and termination, a first electrical connection joining said intermediate point and said beginning, a resistor joining said tap and a first point of fixed potential, a capacitor in parallel with said resistor, a first transistor connected emitter to said first connection, base to said end, and collector to said first point, and a second transistor connected emitter to said tap, base to said termination, and collector to said first point, switching means for momentarily connecting said start to a second point of fixed potential.

2. A priority circuit comprising a plurality of substantially identical low-pass pi filter sections in series, the series elements of said sections, comprising reactors wound on square loop cores, and the shunt elements comprising the emitter-collector capacitance of transistors, characterized in that each of said cores is linked by a winding connected to the base of its adjacent transistor, the sense of said winding being that which for one state of magnetization of a core, regenerative switching will result upon application of an appropriate energy source.

3. A priority circuit comprising a plurality of low-pass filter sections in cascade, characterized in that the series elements of said sections comprise a first square-hysteresis-loop magnetic core, a last square-hysteresis-loop magnetic core, a plurality of intermediate square-hysteresis-loop magnetic cores, a first winding on said first core, having a start, an intermediae point, and a termination, connecting means including windings on said intermediate cores joining said intermediate point to said beginning and resistive means joining said tap to a first point of fixed potential, and the shunt elements of said sections comprise a first transistor connected emitter to said intermediate point, base to said end, and collector to said first point, and a last transistor connected emitter to said tap, base to said termination, and collector to said first point.

4. A priority circuit comprising a plurality of low-pass pi filter sections in series, the series elements of said sections, comprising coils wound on square loop cores, the shunt elements comprising emitter-collector capacitances of transistors, characterized in that each of said cores is linked by a winding connected to the base of its adjacent transistor, the sense of said winding being that which for one state of magnetization of a core, regenerative switching results upon application of an appropriate energy source.

5. A priority circuit comprising a first ferromagnetic core, a second ferromagnetic core, a winding on said first core, having a start, an intermediate point, and an end, a second winding on said second core having a beginning, a tap, and termination, a first electrical connection joining said intermediate point and said beginning, a resistor joining said tap and a first point of fixed potential, a capacitor in parallel with said resistor, a first transistor connected emitter to said first connection, base to said end, and collector to said first point, and a second transistor connected emitter to said tap, base to said termination, and collector to said first point, and, switching means for momentarily connecting said start to a second point of fixed potential whereby no more than one of said cores is reversed in magnetization, said one being the first in line, having that polarization which allows switching by regenerative action between core winding and transistor.

6. A priority circuit comprising a first square-hysteresis-loop magnetic core, a second square-hysteresis-loop magnetic core, a first winding on said first core, having a start, an intermediate point, and an end, a second winding on said second core having a beginning, a tap, and a termination, a first electrical connection joining said intermediate point to said beginning, resistive means joining said tap and a first point of fixed potential, a first transistor connected emitter to said first connection, base to said end, and collector to said first point, and a second transistor connected emitter to said tap, base to said termination, and collector to said first point, switching means for momentarily connecting said start to a second point of fixed potential wherefor no more than one of said cores is reversed in magnetization, said one being the first in line, having that particular polarization which allows switching by regenerative action between core winding and transistor, and winding means on said cores, whereby either of said cores may be set to said particular polarization.

7. A priority circuit comprising a first square-hysteresis-loop magnetic core, a last square-hysteresis-loop magnetic core, a plurality of intermediate square-hysteresis-loop magnetic cores, a first winding on said first core, having a start, an intermediate point, and an end, a last winding on said last core having a beginning, a tap, and a termination, connecting means including windings on said intermediate cores joining said intermediate point to said beginning, resistive means joining said tap and a first point of fixed potential, a capacitor connected in parallel with said resistor, a first transistor connected emitter to said intermediate point, base to said end, and collector to said first point, and a last transistor connected emitter to said tap, base to said termination, and collector to said first point, a switching transistor connected collector to said start and emitter to said second point of fixed potential means for applying pulses to the base of said switching transistor whereby no more than one of said cores is reversed in magnetization, said one being the first in line, having that particular polarization which allows switching by regenerative action between core winding and transistor, separate input winding means on each said cores, whereby any of said cores may be set to said particular polarization, separate output windings on each of said cores, and a sensing winding, serially linking in the same winding sense said first, intermediate, and last cores.

8. A priority circuit comprising a plurality of substantially identical low-pass pi filter sections in series, the series elements of said sections comprising a first square-hysteresis-loop magnetic core, a last square-hysteresis-loop magnetic core, a plurality of intermediate square-hysteresis-loop magnetic cores, a first winding on said first core, having a start, an intermediate point, and a termination, connecting means including windings on said intermediate cores joining said intermediate point to said beginning and resistive means joining said tap to a first point of fixed potential, the shunt elements of said sections comprising a first transistor connected emitter to said intermediate point, base to said end, and collector to said first point, and a last transistor connected emitter to said tap, base to said termination, and collector to said first point, switching means for momentarily connecting said start to a second point of fixed potential whereby no more than one of said cores is reversed in magnetization, said one being the first in line, having that particular polarization which allows switching by regenerative action between core winding and transistor, in further combination with winding means on said cores whereby any of said cores may be set to said particular polarization.

9. A priority circuit comprising a first square-hysteresis-loop magnetic core, a last square-hysteresis-loop magnetic core, a plurality of intermediate square-hysteresis-loop magnetic cores, a first winding on said first core, having a start, an intermediate point, and an end, a last winding on said last core having a beginning, a tap, and a termination, connecting means including windings on said intermediate cores joining said intermediate point to said beginning, resistor joining said tap and a first point of fixed potental, a capacitor connected in parallel with said resistor, a first transistor connected emitter to said intermediate point, base to said end, and collector to said first point, and a last transistor connected emitter to said tap, base to said termination, and collector to said first point, switching means for momentarily connecting said start to a second point of fixed potential whereby no more than one of said cores is reversed in magnetization, said one being the first in line, having that particular polarization which allows switching by regenerative action between core winding and transistor, and winding means on said cores, whereby any of said cores may be set to said particular polarization.

References Cited by the Examiner

UNITED STATES PATENTS 3,018,389 1/1962 Herscher ----------- 340—174

IRVING L. SRAGOW, *Primary Examiner.*

JOHN F. BURNS, *Examiner.*